April 3, 1934.  L. S. BURGETT ET AL  1,953,915
WELDING ROD CONDUIT
Filed Oct. 22, 1931   2 Sheets-Sheet 1

INVENTORS
Lynn S. Burgett
William F. Daugherty
BY Evans & McCoy
ATTORNEYS

April 3, 1934.  L. S. BURGETT ET AL  1,953,915
WELDING ROD CONDUIT
Filed Oct. 22, 1931  2 Sheets-Sheet 2

INVENTORS
Lynn S. Burgett
William F. Daugherty
BY Evans & McCoy
ATTORNEYS

Patented Apr. 3, 1934

1,953,915

UNITED STATES PATENT OFFICE 1,953,915

WELDING ROD CONDUIT

Lynn S. Burgett, Euclid, and William F. Daugherty, Cleveland, Ohio, assignors to Una Welding & Bonding Company, East Cleveland, Ohio, a corporation of Delaware Application October 22, 1931, Serial No. 570,366

4 Claims. (Cl. 219—8)

This invention relates to flexible welding rod conduits for automatic welding units and has for its object to provide a flexible, inextensible conduit of tubular form through which a wire welding rod may be fed from a feed device to a delivery nozzle provided with a handle so that it may be readily presented to and guided over the work being welded.

In automatic welding machines in which the feed of the welding rod is controlled automatically to maintain an arc, it is highly important that the movements imparted to the wire by the automatically controlled feed mechanism be instantly transmitted to the tip of the rod in the arc, and heretofore when attempts have been made to feed a considerable length of wire from the wire feeding head through a flexible conduit considerable difficulty has been experienced in maintaining a uniform arc due to the retarding of the wire in the conduit due to friction and the tendency of the conduit to stretch when subjected to the frictional pull of the wire and to snap back to its original length when the pull becomes great enough to overcome the friction of the wire.

It is an object of the present invention to provide a flexible guide conduit which is so constructed that its effective length is not altered by bending thereof or by a pull on the conduit due to frictional engagement of the welding rod with the walls of the conduit.

A further object is to provide a conduit which is so constructed that the conduit is held to a relatively large radius of curvature at any bend therein so that wear on the conduit is lessened and the feed of the wire welding rod therethrough is not materially impeded when the conduit is bent.

A further object of the invention is to provide a flexible, inextensible tubular conduit having tubular coupling members anchored to the ends thereof which are adapted to be secured to the wire feeding head and to the handle controlled nozzle through which the wire is delivered to the welding arc.

A further object of the invention is to provide a composite flexible conduit composed of a tubular core in the form of a helically wound metal ribbon, and a flexible exterior tension element or covering for the core which is anchored to the core and which holds the helical ribbon core under compression and against elongation.

A further object of the invention is to provide an inextensible covering consisting of closely spaced strands of metal wire extending longitudinally over the helical ribbon and each wound about the core with a small helical pitch or helix angle.

A further object is to provide means for anchoring the helical ribbon core and the exterior tension element or covering together and to the coupling members at the ends of the conduit in such manner that the covering is held tightly against the helical ribbon core throughout the length thereof and positively prevents elongation thereof by a pull on the conduit or by flexing thereof.

A further object of the invention is to provide means in connection with each of the coupling members for preventing sharp bends in the conduit adjacent the coupling members.

A further object is to provide means at the delivery end of the conduit for supplying current to the welding rod so that the voltage drop due to passage of the current through the rod to the arc is low and so that heating of the rod within the flexible conduit is avoided.

With the above and other objects in view, the invention may be said to comprise the device, as illustrated in the accompanying drawings, hereinafter described, and particularly set forth in the appended claims, together with such variations and modifications thereof as will be apparent to one skilled in the art to which the invention appertains.

Reference should be had to the accompanying drawings forming a part of this specification, in which.

Figure 1:
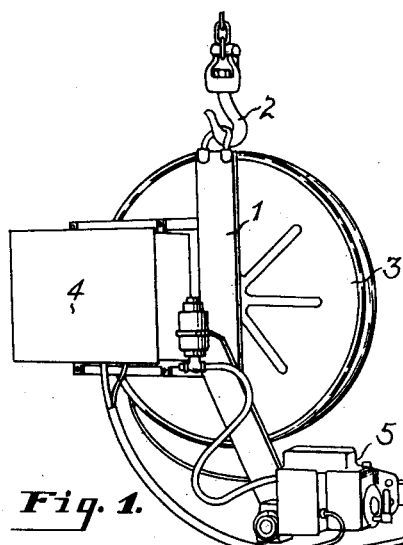
Fig. 1 is a perspective view of a welding unit in which the device of the present invention may be employed.

In the accompanying drawings the device of the present invention is shown applied to an automatic welding unit. As shown in Fig. 1, this unit comprises a supporting frame 1 which is adapted to be suspended from a stationary or movable overhead support by any suitable means such as a hook 2 and this frame supports a wire reel 3, a housing 4 for the electrical controlling mechanism, and a wire feeding head 5. A flexible conduit 6 forms a wire guide from the wire feeding head 5 to a rigid delivery nozzle 7 attached to the delivery end of the conduit and through which the wire welding rod is fed to the welding arc. In the operation of the machine, the wire is advanced from the reel 3 through the wire feeding mechanism of the head 5 which is automatically controlled by mechanism in the housing 4, as is common practice in the art. The rigid nozzle 7 has a handle 8 attached thereto by means of which an operator may hold the nozzle in position to deliver the welding rod to the welding arc and guide the nozzle 7 along the work during a welding operation.

Figure 10:
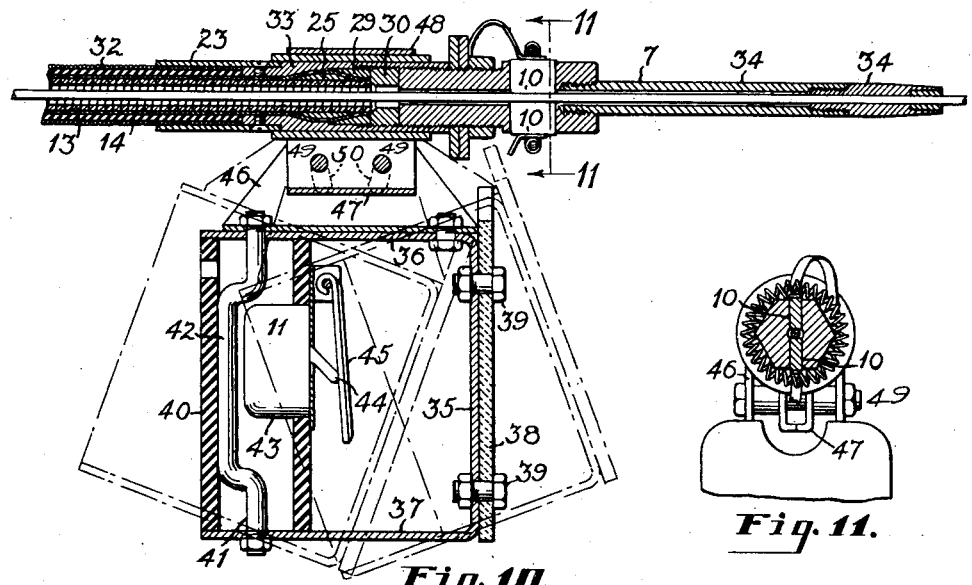
Fig. 10 is a sectional view showing the wire delivery nozzle and the handle attached to the delivery end of the conduit.

In metallic arc welding apparatus, such as illustrated in Fig. 1, the electric current is preferably delivered to the welding rod at the delivery nozzle and as shown in Figs. 1 and 10 a conductor cable or conduit 9 leads from the controller housing to the delivery nozzle where it is connected to the wire through brushes 10, the flow of current to the nozzle and wire welding rod being controlled by a switch 11 on the handle 8.

During the welding operation the operator grasps the handle 8 with one hand and points the delivery nozzle 7 to the part to be welded with the end of the wire electrode touching the work, whereupon he closes the switch 11 with his hand and thereby causes current to pass through the welding rod to the work, whereupon the automatically controlled feed mechanism draws the welding rod away from the work to strike an arc between the end of the rod and the work. The operator may then move the nozzle about over the work to control the deposit of metal from the welding rod to the work, the feed of the welding rod being automatically controlled to maintain an arc of substantially constant length.

Figure 2:
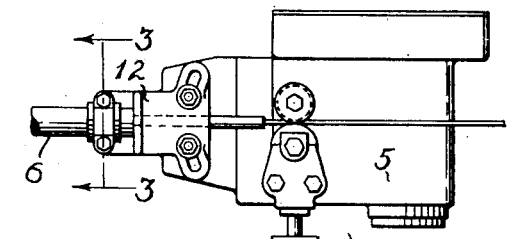
Fig. 2 is a rear elevation of the wire feeding head.
Figure 3:
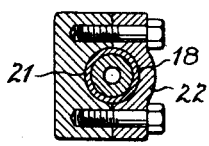
Fig. 3 is a section taken on the line indicated at 3—3 in Fig. 2.

As shown in Fig. 2 of the drawings, the wire feeding head 5 is provided at its delivery end with an adjustable wire guide 12 through which the wire passes to the conduit 6 which is attached thereto.

Figure 4:
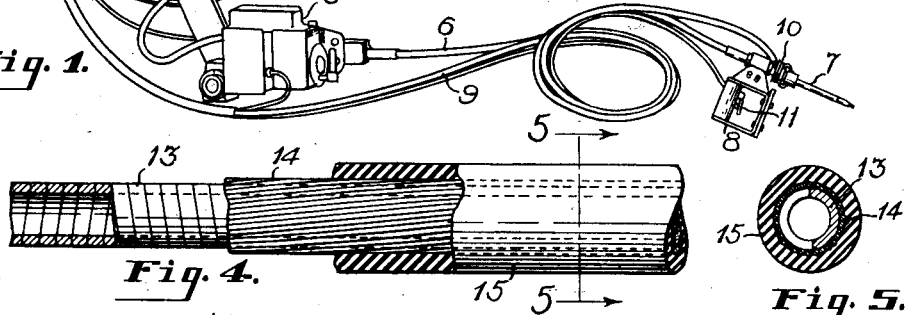
Fig. 4 is a fragmentary view showing the construction of the body of the conduit.
Figure 5:
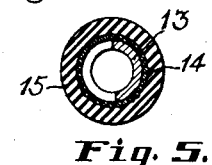
Fig. 5 is a section taken on the line indicated at 5—5 in Fig. 4.
Figure 6:
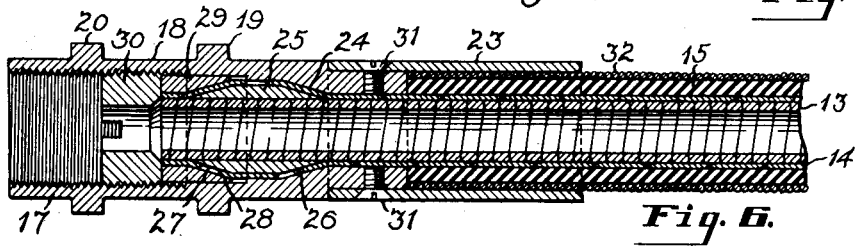
Fig. 6 is an axial section through the feeder head end of the conduit showing the attachment of the coupling member to the conduit.
Figure 7:
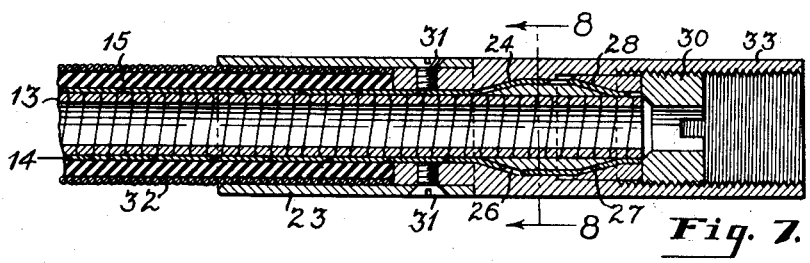
Fig. 7 is an axial section through the coupling member at the delivery end of the conduit showing the means by which it is attached to the conduit.
Figure 8:
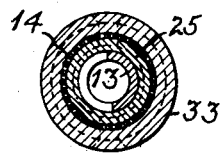
Fig. 8 is a section taken on the line indicated at 8—8 in Fig. 7.
Figure 9:
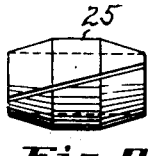
Fig. 9 is a side elevation of one of the clamping collars for anchoring the metal core of the conduit to the coupling members.

As herein shown, the flexible wire guiding cable or conduit is formed with a flexible tubular inner member 13 formed of a continuous metal ribbon, preferably a steel ribbon wound helically in closely associated coils of a diameter to form a flexible metal tube, the internal diameter of which is suitable for guiding the wire welding rod. This inner member which would normally be readily extensible is positively held against elongation by means of a relatively inextensible covering which is anchored to the ends thereof. As shown in Fig. 4 this covering may consist of a series of contiguous strands of wire 14 such as steel piano wire extending longitudinally of the conduit and winding around the core at a very slight pitch or helix angle, the spiral ribbon tube and relatively inextensible covering forming a flexible metal core for the conduit.

Outside the flexible metal core formed by the helical ribbon and the longitudinal wires 14, the cable is provided with a covering 15 of insulating material which may be in the form of an enveloping layer of rubber vulcanized on the metal core. At the end thereof which is joined to the feeder head 5 the conduit 6 has attached thereto a coupling member 17 which is provided at its outer end with a cylindrical bearing portion 18 and ribs 19 and 20 at opposite ends of the bearing portion. The cylindrical bearing portion 18 is received in a semi-cylindrical socket 21 in the adjustable guide 12 and is held in place by a cap plate 22 which loosely clamps the bearing portion 18 to maintain the axial alinement of the coupling member while permitting the same to turn freely about its axis so that the conduit has a swivel connection with the head and will not be distorted by twisting.

To the inner end of the coupling member 17 there is rigidly attached a metal sleeve 23 preferably of brass which projects past the inner end of the coupling member and receives an end of the cable 6. The coupling member 17 is of an internal diameter at its inner end such that the metal core of the conduit, composed of the helical ribbon tube 13 and wire covering 14 fits within it, and is provided with a counterbore which is tapered at its inner end to provide a conical seat 24. Adjacent the end of the conduit a longitudinally split, contractible metal sleeve 25 fits upon the spiral ribbon tube 13 within the wire covering 14. The sleeve 25 has tapered ends 26 and 27, the taper of the inner end 26 of the sleeve corresponding to that of the conical seat 24 in the coupling member 17, and the outer end 27 to a conical seat 28 on the interior of a ring 29 which has a sliding fit within the counterbore of the coupling member. The outer end of the counterbore is threaded to receive a clamping nut 30 which may be screwed against the ring 29 to force the same axially onto the sleeve 25 clamping the wires 14 between the tapered ends 26 and 27 and the seats 24 and 28 and contracting the sleeve into tight gripping engagement with the tube 13, thereby anchoring the sleeve 25 in the coupling member 17, anchoring the end of the tube 13 in the sleeve and clamping the wires 14 to the sleeve.

In applying the wire covering 14 the wires are wrapped snugly upon the core 13 and over the tubular sleeves 25 on the ends thereof so that when anchored to coupling members at the ends of the conduit the wires positively prevent elongation of the tube 13.

In applying coupling member to the conduit, an end of the metal core of the conduit projecting beyond the covering 15 is inserted into the inner end of the coupling member, the collar 25 is inserted into the outer end of the coupling member onto the tube 13 within the wires 14, the ring 29 placed over the tapering end 27 and the wires overlying the same, and the nut 30 is then screwed into place.

The outer sleeve 23 which is preferably detachably connected to the coupling 17 by means of screws 31, is of an internal diameter slightly greater than the external diameter of the outer insulating covering of the conduit and projects inwardly from the coupling member over the body of the conduit. A coil spring 32 fits snugly within the tubular sleeve 23 and projects past the open inner end of the sleeve. The spring 32 fits upon the insulated portion of the conduit inwardly of the coupling 17 and serves to stiffen the conduit adjacent the end of the sleeve 23 so that when the conduit is bent the portion thereof adjacent the inner end of the sleeve 17 will be held to a relatively large radius of curvature and will not be damaged by being bent sharply over the inner end of the sleeve.

At its opposite end the conduit 6 has attached thereto a coupling member 33 which may be identical with the coupling member 17 except that it need not have the bearing portion 18 and external ribs 19 and 20. The tubular delivery nozzle 7, which, as shown in Fig. 10, may consist of sections 34 screwed together end to end, may be screwed into the outer end of the coupling member 33. By increasing or decreasing the number of sections of the nozzle its length may be increased or decreased as may be desirable for different welding operations.

The anchoring elements in this coupling member are identical with those in the coupling member 17 and are indicated by the same reference numerals as are the outer metal sleeve and the coil spring interposed between the sleeve and conduit.

The coil springs 32 cause the cable to bend on a relatively large radius immediately adjacent both coupling members where the cable is subjected to the greatest bending stresses and where the cable would otherwise be subjected to excessive wear.

The helical metal tube 13, which is formed of a metal ribbon wound into a helical form and having its coils disposed at a relatively high helix angle, would be elongated by an endwise pull or by a flexing of the conduit such as occurs during the use of the welding unit. Such elongation is, however, positively prevented in the conduit of the present invention by the longitudinal wires 14 which are wound snugly upon the core 13 and which extend over the coils of the core 13 at a very small helix angle, since the ends of the wires 14 are firmly anchored to the tube 13 at the opposite end of the conduit. The longitudinal wires 14 permit the cable to flex freely but positively prevent elongation of the cable either by a longitudinal pull on the cable or by bending of the cable. The non-extensible character of the flexible cable is highly important in welding apparatus of the type above described for the reason that the rate of feed of the wire through the conduit to the delivery nozzle is automatically controlled during the welding operation to maintain an arc of substantially predetermined length. If the flexible conduit through which the wire is fed were subject to variations in length due to flexing movements of the conduit due to friction of the welding rod, it is apparent that the movements of the conduit due to stretching and snapping back to original length while the operator is moving the nozzle to different portions of a weld while maintaining the nozzle at the same distance from the work, would cause movements of the welding rod with respect to the work which would not be compensated by the automatic feed and that there would be variations in the length of the arc which would be highly undesirable. With a flexible conduit of invariable length, such as provided by the present invention, the automatic wire feed mechanism is not required to compensate for such variations and a much more uniform weld may be obtained.

The brushes 10 have sliding contact with the welding rod and deliver current thereto at a substantially fixed distance from the arc so that there is a predetermined and substantially uniform voltage drop due to the resistance of the welding rod, which is advantageous in that a more uniform arc is maintained.

Figure 11:
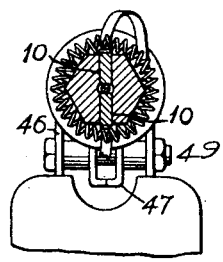
Fig. 11 is a section taken on the line indicated at 11—11 in Fig. 10.

As shown in Figs. 10 and 11, the handle 8 comprises a U-shaped metal frame 35, the web or base portion of which faces forwardly and which is provided with rearwardly extending top and bottom flanges 36 and 37. A guard plate 38 is attached to the web or base of the frame 35 by means of bolts 39 and a hollow hand grip member 40 is secured between the rear ends of the flanges 36 and 37 by means of a bolt 41 which has a rearwardly offset portion 42 within the member 40 to provide space for a casing 43 which houses the switch 11 controlling the flow of current to the welding electrode. The switch 11 has a projecting finger 44 which is engaged by a pivoted actuating member 45 hinged to swing about a horizontal pivot above the finger 44. The actuating member 45 normally rests by gravity on the projecting finger 44 of the switch 11 which is a normally open switch and in gripping the hand grip member 40 the operator's fingers overlie the actuating member 45 so that he can readily apply pressure to close the switch.

To the top flange 36 of the frame 35 there is attached a U-shaped attaching member 46 which straddles a downwardly projecting portion 47 of an attaching clip 48 which embraces the coupling member 33 to which the nozzle 7 is attached. The flanges of the attaching member 46 are attached to the projecting portion 47 of the clip by means of bolts 49 which also serve to draw the body of the clip 48 into clamping engagement with the coupling member 33.

The handle may be rigidly attached to the coupling member which carries the rigid delivery nozzle 7 in various angular positions for convenience in manipulating the nozzle for different positions of the work, the attaching member 46 having slots 50 which permit such adjustments, the handle providing a pistol grip which enables the operator to easily control the position of the nozzle. The brushes 10 are preferably mounted in the end of the coupling member 33 to which the nozzle 7 is attached, and these brushes contact with the welding rod as it passes through the coupling member.

Figure 12:
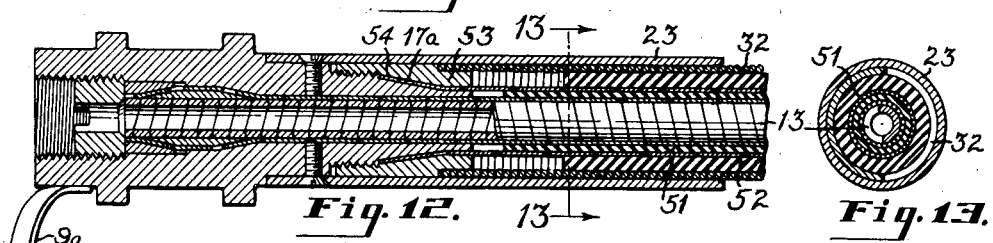
Fig. 12 is a sectional view showing a conduit in which means is provided for conducting electricity through the conduit.
Figure 13:
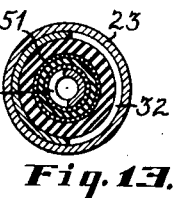
Fig. 13 is a section taken on the line indicated at 13—13 in Fig. 12.

If desired means may be embodied in the conduit for conducting electricity to the welding rod, and such a structure is shown in Figs. 12 and 13 of the drawings. In this modification the metal core of the conduit has a relatively thin covering 51 of insulating material and over this covering there is placed braided copper wire 52 which serves as a conductor for electricity, the copper wire being anchored at its ends to the coupling members. For anchoring the copper wire each coupling member is provided with a tapered inner end 17a and has screwed thereon a clamping collar 53 which has a tapered interior seat 54 which clamps the copper wire against the tapered end of the coupling member. The coupling member at the feed-in end of the conduit may be provided with a pigtail 9a through which current may be passed from the source, and current passes through the coupling members and wires 52 to the brushes 10 adjacent the delivery nozzle.

Figure 14:
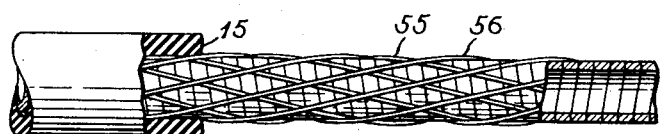
Fig. 14 is a fragmentary view showing a modified conduit construction.

As shown in Fig. 14 of the drawings the wire covering for the inner helical ribbon tube may consist of steel wires 55 and 56 wound in opposite directions over the inner tube. The wires 55 and 56 may be anchored to the coupling members and to the ends of the inner tube in exactly the same way as in the modification first described.

Figure 15:
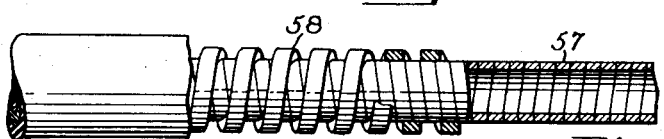
Fig. 15 is a fragmentary view showing a further modification.
Figure 16:
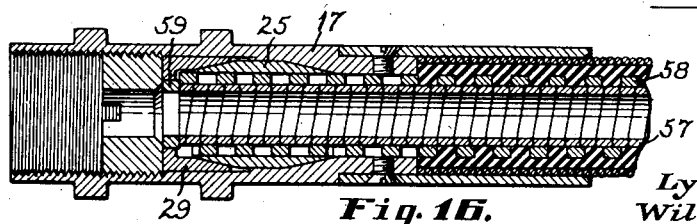
Fig. 16 is an axial section showing the manner of attaching the coupling members to the conduit shown in Fig. 15.

An additional modification is shown in Figs. 15 and 16 in which the metal core of the conduit consists of an inner helical ribbon tube 57 and an outer helical ribbon tube 58. The outer tube in this case is stretched over the inner tube spreading the coils thereof, so that the spring tension of the outer tube holds the inner tube in compression and prevents elongation thereof by the frictional drag of the welding rod passing therethrough. To hold the outer tube in place on the inner the end coils 59 of the outer tube are reduced to the diameter of the inner tube and engage the ends thereof. The metal core is clamped to the coupling members by means of the split sleeves 25 which, as shown in Fig. 16, fit upon the outer tube 58.

The flexible conduit permits easy manipulation of the delivery nozzle, and inasmuch as this conduit is of invariable length, regardless of flexing movements of the conduit or the frictional drag of the welding rod, the feed of the end of the welding rod in the arc will be accurately controlled by the automatic feed mechanism and the automatic control of the arc will not be interfered with by sudden relative movements of the conduit and welding rod such as occur when a conduit is stretched by the frictional drag of the welding rod so that it snaps back when the tension becomes sufficient to overbalance the friction.

What we claim is:

1. A flexible inextensible conduit for welding rods, comprising a metal core consisting of a helically wound metal ribbon and a series of wires wound tightly over the helical ribbon on helices of a small angle, a coupling member secured to each end of the cable, means for anchoring said wires to the coupling member and to the ends of said spiral ribbon, and a covering of insulating material over said metal core.

2. A flexible inextensible welding rod conduit comprising a metal core consisting of a helically wound strip of metal and a series of wire strands wrapped around the helically coiled metal strip and extending longitudinally thereof at a small helix angle, a sleeve rigidly secured upon each end of the helically wound strip within the wire covering, said sleeves forming enlargements of the metal core, coupling members at the ends of the cable having means for clamping said enlargements, and a covering of insulating material enveloping the metal core between the coupling members.

3. A flexible inextensible conduit for welding rods comprising a tube formed of a helically wound metal strip, a contractile sleeve having tapering ends secured upon opposite ends of said tube, a covering composed of parallel strands of wire extending longitudinally of the tube and wound around the tube and sleeves at a small helix angle, a coupling member at each end of the tube, each coupling member having parts fitting on the wire covered tube inwardly and outwardly of one of said sleeves, said parts being relatively adjustable in an axial direction and having flaring seats for clamping the wire strands against the tapered ends of a sleeve, and a covering of insulating material enveloping the wire covered tube between the coupling members.

4. A flexible inextensible conduit for welding rods, comprising a metal core consisting of a helically wound metal ribbon and a series of wires wound tightly over the helical ribbon on helices of a small angle, a coupling member secured to each end of the cable, means for anchoring said wires to the coupling member and to the ends of said core, a covering of insulating material over said metal core, sleeves attached to the coupling members extending inwardly over the conduit; and a coil spring interposed between said cable and each of said sleeves, and extending inwardly beyond the end of each sleeve.

LYNN S. BURGETT.
WILLIAM F. DAUGHERTY.